H. H. M. KAMMERHOFF.
ELECTRIC GAS ENGINE STARTING AND BATTERY CHARGING SYSTEM.
APPLICATION FILED OCT. 14, 1914.

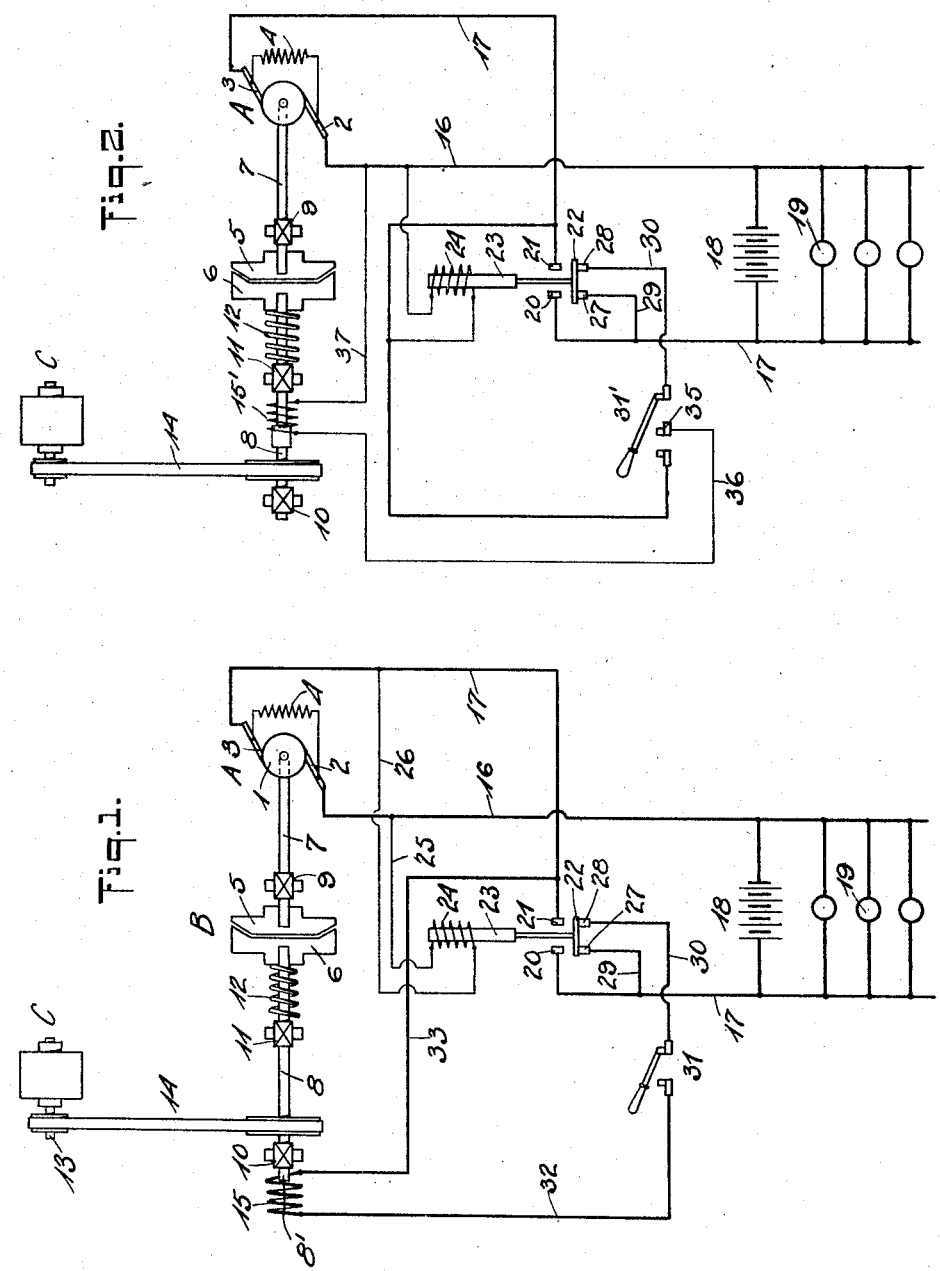

1,225,643.

Patented May 8, 1917.
2 SHEETS—SHEET 2.

UNITED STATES PATENT OFFICE.

HEINRICH H. M. KAMMERHOFF, OF ORANGE, NEW JERSEY.

ELECTRIC GAS-ENGINE-STARTING AND BATTERY-CHARGING SYSTEM.

1,225,643.　　　　　Specification of Letters Patent.　　Patented May 8, 1917.

Application filed October 14, 1914. Serial No. 866,622.

*To all whom it may concern:*

Be it known that I, HEINRICH H. M. KAMMERHOFF, a subject of the Emperor of Germany, and a resident of Orange, in the county of Essex and State of New Jersey, have invented a new and Improved Electric Gas-Engine-Starting and Battery-Charging System, of which the following is a full, clear, and exact description.

This invention relates to a gas engine starting apparatus and has to deal more particularly with starters of that type in which a dynamo electric machine is adapted to be used as a motor for starting the engine and as a dynamo after the engine is started, whereby can be charged the storage battery that initially supplies current to the dynamo electric machine to operate it as a motor, and whereby current can be utilized for the lamps of the automobile. Obviously the invention is not necessarily limited to starting, charging and lighting systems for automobiles, as it is applicable to stationary plants.

In automobile equipments of the character referred to the desideratum is a minimum of weight and cost concerning the dynamo electric machine and battery, and owing to the fact that high current is required, these two elements of the system are often subjected to excessive strains.

The general objects of the present invention are to improve the design of starting, charging and lighting systems which overcomes the difficulties inherent in the present systems, by a novel arrangement of instrumentalities whereby the current is prevented from rising higher than desirable for the type of dynamo electric machine and battery employed.

More specifically the objects of the invention are to provide a dynamo electric machine which has its rotor connected with the gas engine to be started through a frictional coupling or clutch which is electro-magnetically controlled to vary the frictional engagement between the parts as the dynamo electric machine is used as a motor for starting the engine and as it is used as a dynamo when driven by the engine after it has been started, there being in the circuit of the dynamo electric machine, storage battery and lamps, an automatic switch whereby the battery will be charged with current when the speed of the dynamo electric machine operating as a generator will reach a predetermined point, and also whereby the portion of the circuit in which the controlling or starting switch is included will be cut out or open circuited.

For a more complete understanding of the invention reference is to be had to the following description and claims taken in connection with the accompanying drawings, wherein similar characters of reference indicate corresponding parts in all the views, and in which—

Figure 1 is a diagrammatic view of a gas engine starting system in which the dynamo electric machine operates as a starting motor for the engine and as a generator of current after the engine is started;

Fig. 2 is a diagrammatic view of a modified form of the system employing a single dynamo electric machine.

Figure 3:
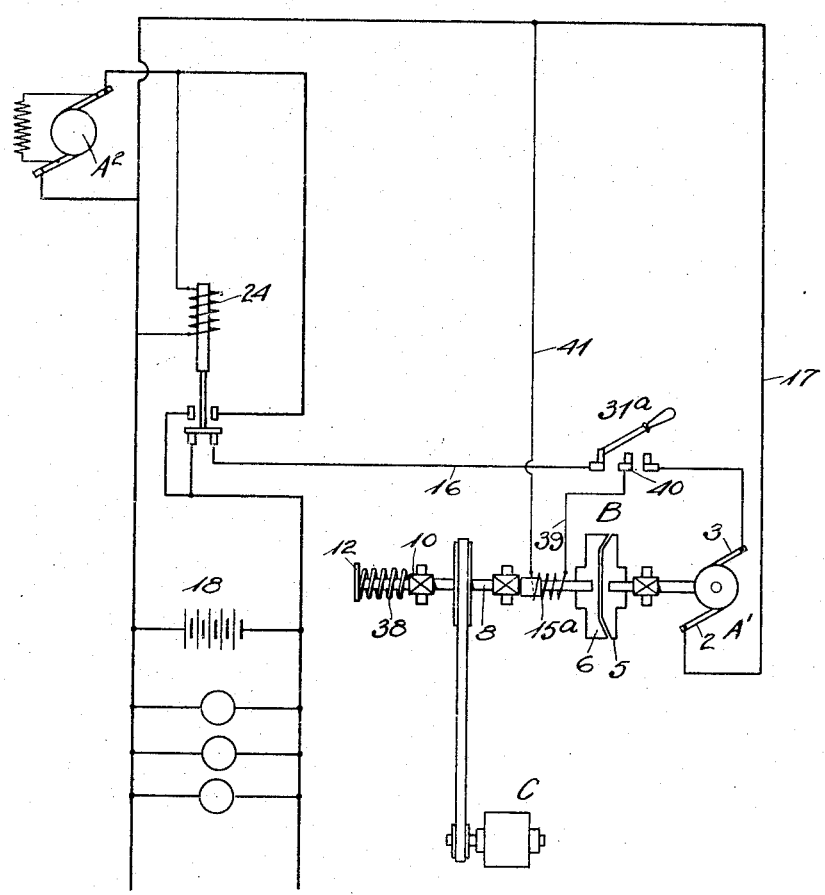
Fig. 3 is a diagrammatic view of the system equipped with a dynamo electric machine for starting the gas engine and an additional dynamo electric machine to supply the charging and lighting current.

Referring to the drawing, A designates a dynamo electric machine having an armature 1, brushes 2 and 3, and an energizing coil 4, and this machine is connected through a clutch or coupling device B with a gas engine C to be started. In the present instance the clutch device is shown as two frictional cone elements 5 and 6 connected respectively with the shafts 7 and 8, the former shaft being connected with the rotor of the machine A and being journaled in a bearing 9. The other shaft 8 is journaled in bearings 10 and 11, and between the latter and clutch element 6 is a spring 12 encircling the shaft 8 and pressing the element 6 against the element 5. The shaft 8 is connected in any suitable manner with the shaft 13 of the gas engine C, the connection shown in the present instance being a pulley and belt transmission 14. An electro-magnetic means is adapted to operate on the spring-pressed element 6 of the clutch so as to control the frictional engagement between the clutch elements. Any suitable means may be employed to electrically control the element 6, but in the present instance the shaft 8 is adapted to have a limited longitudinal movement in its bearings, and the end 8' of the shaft forms the core of a solenoid winding 15 which is adapted to be connected in circuit with the electric machine A during the starting of the engine.

The dynamo electric machine A is connected with the mains 16 and 17, across which is connected a storage battery 18 which supplies current to drive the machine A as a motor when starting the engine, and which is charged by the machine A when the latter is driven by the gas engine, and by means of these mains current may be supplied to the lamps 19 of the automobile. The wire 17 is broken and provided with contacts 20 and 21 which are adapted to be engaged by a bridging contact 22, so that the charging and lighting circuit will be completed, such bridging being connected with the core 23 of a solenoid winding 24 that has its terminals connected by wires 25 and 26 across the mains 16 and 17. Coöperating with the bridging contacts and normally engaged by the latter when the engine is idle or being started are contacts 27 and 28 which are in turn connected by wires 29 and 30 with the main 17, and with the controlling or starting switch 31, one side of which is connected by a wire 32 with the clutch-controlled solenoid or magnet 15. The contact 27 is connected with the wire 17 at a point between the battery 18 and contact 20 and between the contact 21 and machine A, the wire 17 is connected by a wire 33 with the solenoid 15.

In starting the gas engine C it will be assumed that the battery 18 is charged, as it must supply current to the dynamo electric machine to operate as a motor. The operator closes the starting switch 31 and current flows from the battery 18 through the path consisting of the main 16, machine A, main 17, wire 33, electrical device 15, wire 32, starting switch 31, wire 30, contacts 28, 22 and 27, wire 29, main 17 and battery 18. The dynamo electric machine operating as a motor transmits power from the shaft 7 to the shaft 8 through the clutch device B, and in this manner the engine C is started. The object of the clutch-controlling electric device 15 is to enable the gas engine to be started smoothly and without shocks, and as this device 15 is in series with the dynamo electric machine it receives current variable with the load on the starting motor, and the design of the parts is such that the spring presses the clutch element 6 tightly enough against the clutch element 5 to cause an effective transmission of power to the gas engine. If the current passing through the dynamo electric machine A becomes higher than desired, due to too great a load, the coil 15 operates to pull the shaft 8 to the left, whereby the clutch elements relatively slip and the load on the machine A lessens, and as a consequence the current flowing is diminished and the magnet device 15 looses part of its pull, so that the clutch elements reëngage and with such a grip that the machine A transmits power therethrough to the engine. In this manner the dynamo electric machine is effectively clutched to the gas engine, but a certain slip is allowed whereby the engine will be started smoothly and without shock.

After the engine has been started it acts as a prime mover for the dynamo electric machine A, so that the latter will become a generator of current, and when the speed attains a predetermined point the solenoid 24 will become energized so that the switch formed by the contacts 20, 21 and 22 will be closed and current will be supplied to the battery 18 to charge the same, and to the lamps 19.

The system shown in Fig. 2 is somewhat like the one in Fig. 1, with the exception of the electrical device for controlling the clutch, and the similar parts in the two figures will be correspondingly numbered. The clutch-controlling switch 15' is adapted to be connected across the mains when the starting switch 31' is closed, this switch having an auxiliary contact 35 connected by a wire 36 with one terminal of the magnetic device 15', the other terminal being connected by a wire 37 with the main 16. The magnetic pull exerted by this coil 15' tends to force the shaft 8 to the right and thereby assist the spring 12 to frictionally engage the parts of the coupling. The spring 12 is strong enough to maintain a frictional engagement on the clutch elements that will enable the gas engine C after being started to drive the machine A as a generator while the latter supplies current to charge the battery 18 and feed the lamps 19, but when the dynamo electric machine A acts as a motor to start the gas engine C, additional pressure must be applied to the clutch element 6. For maintaining engagement between the clutch elements 5 and 6 pressure is supplied by the electrical device 15'. When the switch 31' is closed for starting the engine the battery 18 not only supplies the motor A but energizes the coil 15', the magnetizing force of the latter depending entirely upon the pressure of the battery 18. The pressure of this battery varies within certain limits, according to the current taken from it, so that the magnetizing force of the coil 15' will depend directly upon the pressure of the battery and indirectly upon the current supplied from the battery to the machine A when the latter is running as a motor. It is evident therefore that the coil 15' will assist the spring 12 in its action to maintain the frictional engagement of the clutch parts, the action of the coil 15' being stronger as the pressure of the battery 18 is higher, and the flow of current to the dynamo is lower, but this coil 15' will lose its force progressively with the increase of current consumption by the machine A, the result being that the engine will be started smoothly and without shock.

In the modification shown in Fig. 3 the gas engine C is started by an electric motor A' that is connected with the former by the clutch B, as in the other forms of the invention, but the shaft 8 is provided with a spring 38 which operates between the bearing 10 and abutment 12 on the shaft 8 in a manner to tend to move the said shaft to the left. On the shaft is a solenoid winding 15$^a$ which has one terminal connected by a wire 39 with the auxiliary contact 40 of the starting switch 31$^a$, and the other terminal is connected by a wire 41 with the main 17 that leads from the brush 2 to the battery 18. The brush 3 of the motor A' is connected with the main 16, which includes the starting switch 31$^a$, so that when the said switch is closed the winding 15$^a$ will be in shunt with the motor A'.

In this system, when the gas engine C is not running and it is desired to start the same, the switch 31$^a$ is closed, and consequently the motor A' begins to revolve. At the same time this starting switch closes the circuit of the magnetic device 15$^a$, which by being thus energized pulls the shaft 8 to the right, overcoming the force of the spring 38 and engaging the clutch element 6 with the clutch element 5, whereby the starting motor A' will drive the gas engine shaft and start the engine. The starting switch 31$^a$ is opened as soon as the engine is started, and consequently the starting motor A' is cut out of circuit from the battery 18 and the spring 38 comes into action to separate the clutch elements 5 and 6.

To charge the battery 18 a separate charging generator A$^2$ is employed which is suitably driven by the gas engine C by any suitable mechanical connection, the nature of which need not here be shown. In shunt relation to this current generator is the winding 24 of the automatic switch which closes the battery charging circuit and opens the motor starting circuit when the speed of the gas engine and the generator A$^2$ driven thereby reaches a predetermined point.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as are within the scope of the appended claims.

Having thus described my invention, I claim as new and desire to secure by Letters Patent:

1. The combination of an engine to be started, a shaft divided into two sections, means connecting one section of the shaft to the engine, a dynamo electric machine connected with the other section of the shaft, a clutch for operatively connecting the shaft sections, spring means operating on the clutch, a battery connected with the dynamo electric machine, a magnet connected with the battery and dynamo electric machine and operatively related to the clutch for controlling the driving relation of the shaft sections, a starting switch in circuit with the magnet, a solenoid responsive to current generated by the dynamo electric machine after the engine has started and drives the said machine, and a switch controlled by the solenoid for controlling the circuit connections between the dynamo electric machine and battery and the electromagnet.

2. The combination of an engine to be started, a dynamo electric machine adapted to operate as a motor for starting the engine and adapted to be operated as a generator by the engine, clutch elements for connecting the said machine with the engine, yielding means for influencing the driving engagement of the clutch elements, electrical means coöperating with said yielding means to control the driving engagement of the clutch elements, a source of current for the motor, a starting switch for connecting the said electrical means and motor with the said source, a switch for cutting out the starting switch and electrical means from the circuit of the said source, and means responsive to the voltage generated by the said machine when driven by the engine for operating the last-mentioned switch.

3. The combination of an engine to be started, a dynamo electric machine adapted to act as a motor to start the engine and as a generator when driven by the engine, connecting means between the engine and machine and including clutch elements, yielding means for forcing the clutch elements together, electrical means for assisting the said yielding means, a source of current for the said machine, a starting switch for connecting the said source with the motor and for connecting the said electrical means in circuit with the source, and a circuit controller for cutting the said electrical means and starting switch out of circuit when the said machine operates as a generator and for connecting the said machine with the said source for charging the same, said circuit controller including a winding responsive to the voltage of the said machine when operating as a generator.

In testimony whereof I have signed my name to this specification in the presence of two subscribing witnesses.

HEINRICH H. M. KAMMERHOFF.

Witnesses:
CHATTEN BRADWAY,
PHILIP D. ROLLHAUS.